June 26, 1962  C. H. SORTOR  3,040,566
APPARATUS FOR LOCATING LEAKS IN WELL CASINGS
Filed March 7, 1957  2 Sheets-Sheet 1
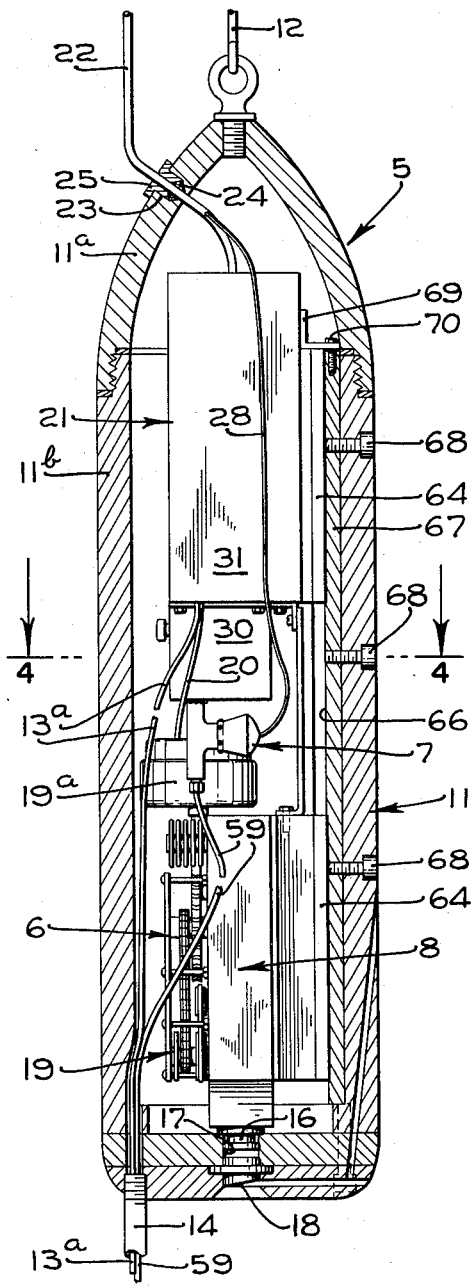
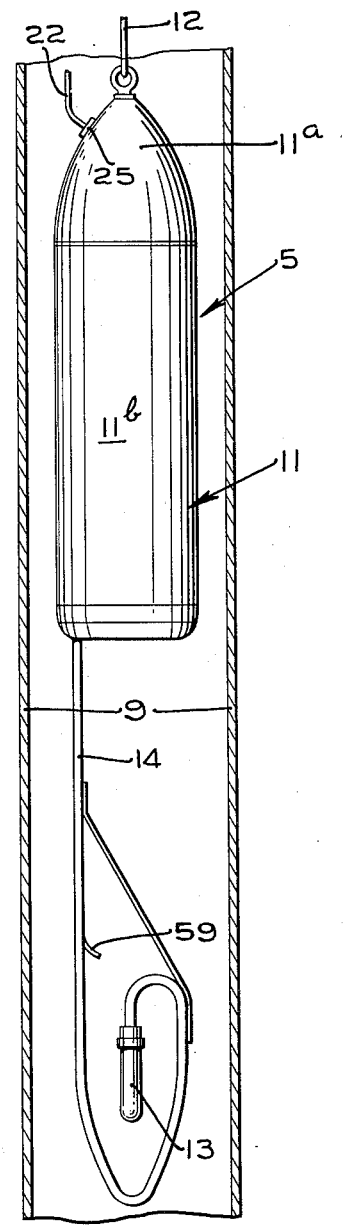
INVENTOR
CHARLES H. SORTOR
BY *Hans G. Hoffmeister*
ATTORNEY June 26, 1962 C. H. SORTOR 3,040,566
APPARATUS FOR LOCATING LEAKS IN WELL CASINGS
Filed March 7, 1957 2 Sheets-Sheet 2
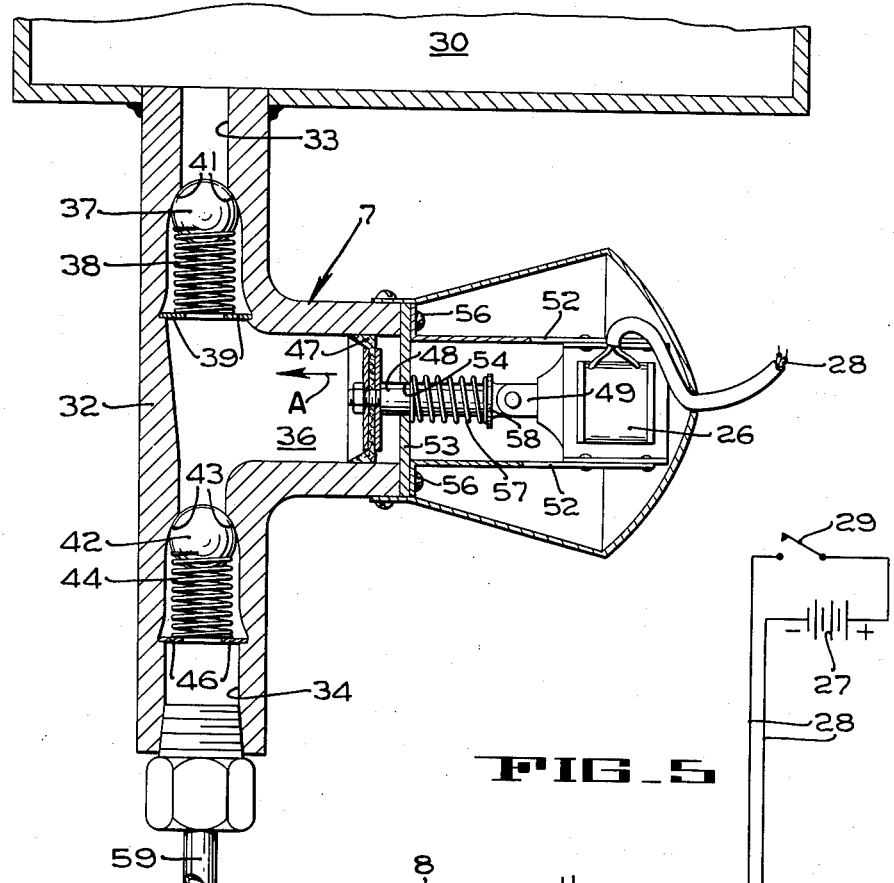
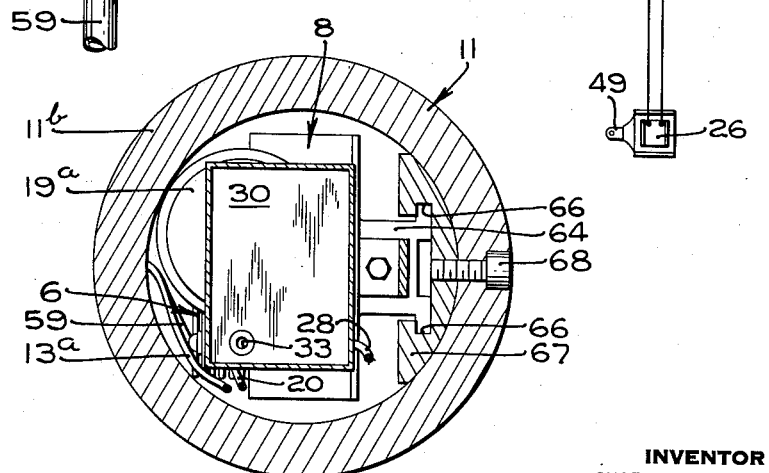
INVENTOR
CHARLES H. SORTOR
BY Hans G. Hoffmeister
ATTORNEY

United States Patent Office 3,040,566
Patented June 26, 1962

---

3,040,566
APPARATUS FOR LOCATING LEAKS IN WELL CASINGS
Charles H. Sortor, Fresno, Calif., assignor to FMC Corporation, a corporation of Delaware
Filed Mar. 7, 1957, Ser. No. 644,661
3 Claims. (Cl. 73—155)

This invention relates to well surveying apparatus, and more particularly to apparatus for locating leaks in inaccessible parts of well casings or other fluid containers.

Water wells and the like usually extend through several water bearing strata that are separated by layers of clay or other relatively impervious material. It frequently occurs that the hydrostatic pressure within one water bearing stratum is considerably different from that within one or more other water bearing strata penetrated by a well and that the existence of such pressure differential is not known at the time of drilling the well. After the well has been drilled and cased, the casing is perforated at what is believed to be the best places to permit the water in selected strata to flow into the well. Because the pressure differential between the selected strata may be of considerable magnitude, water may flow into the well from a high pressure stratum and out of the well into a stratum having a lower hydrostatic pressure.

This situation is particularly undesirable in the case of wells of the artesian type, i.e., wells in which the hydrostatic pressure in one or more water bearing strata is sufficient to cause water to rise to and flow from the top of the well without being pumped. When, for example, a well of this type leaks into a low pressure stratum, water is apt to escape into the low pressure stratum in such quantity that the output of the well is seriously impaired.

Therefore, it frequently is desirable to positively and dependably locate and seal perforations in a well casing below the surface of the ground and through which water escapes from the well.

Another object is to provide apparatus for detecting and making a record of the direction of flow of fluid in a well, which record can be employed to determine the point of entry or escape of fluid and to determine the condition of the adjacent region of the well.

Another object is to provide apparatus for estimating the rate of flow of fluid entering at or escaping from remote locations in a well or the like.

Another object is to provide apparatus for making permanent records of the condition of a well and of the well casing, of the approximate rate and direction of flow of fluid within the well, and of the location of points of entry and escape of fluid into and out of the well, which records can be employed for the purposes of detecting defects, planning corrective measures, and determining if such corrective measures are effective.

These and other objects and advantages of the present invention will become apparent from the following description and the drawings in which:

FIG. 1 is a fragmentary longitudinal section of a well, showing in side elevation therein a leak locating apparatus for performing the method of the present invention.

FIG. 2 is a longitudinal section of the apparatus of FIG. 1, part of the figure being broken away.

FIG. 3 is an enlarged longitudinal section of the dye discharging pump constituting a part of the apparatus of FIG. 2.

FIG. 4 is an enlarged section along lines 4—4 of FIG. 2.

FIG. 5 is a diagram of the electrical circuit associated with the dye discharging pump of FIGS. 2 and 3.

The leak locating device 5 (FIGS. 1 and 2) of the present invention comprises apparatus 6 for photographing the interior of a well, sewer, or other type of conduit or fluid container, and, in combination therewith, suitable means such as a pump 7 (FIGS. 2 and 3) adapted to eject one or more charges of dye or other material that is photographically distinguishable from the well fluid, in such a manner that each ejected charge takes the form of a cloud or puff within the region of the well fluid that lies within the field of a stereoscopic camera 8 constituting a part of the well photographing apparatus 6 and properly loaded with photosensitive film. This permits stereoscopic pictures to be taken, showing the position and formation of one or more clouds within the well fluid, as well as the condition of the adjacent part of the well casing 9 (FIG. 1). The method of the present invention contemplates taking a series of such photographs at predetermined intervals to provide a photographic record of the changes in the form and position of one or more clouds, from which the direction and the rate of movement of the fluid in the well is ascertainable; and these data may be employed to ascertain both the location of leaks in the well casing and the approximate rate at which leakage occurs.

The well photographing apparatus 6 can be of conventional or well known design, such as that forming the subject matter of Patent No. Re. 24,076, issued to Claude Laval, Jr. on October 18, 1955; and since the details of the apparatus 6 do not form part of the present invention, only a general description of its construction and operation will be included herein.

The well photographing apparatus 6 includes a fluid tight carrier or housing 11 (FIGS. 1, 2 and 4) adapted to be lowered into a well and supported at suitable depth therein by a cable 12 secured to the upper end of the housing 11. An electric lamp 13 (FIG. 1) is mounted in fixed position at a suitable distance below the housing 11 by means of a tubular bracket 14 so that upon being lighted, the lamp 13 illuminates a considerable portion of the well below the housing 11 as well as the contents of that part of the well. The stereoscopic camera 8 (FIG. 2) is mounted in the lower part of the housing 11 with each of its two lenses 16 (only one of which is shown) aligned with a hole 17 provided in the bottom of the housing 11. Each hole 17 is sealed by a suitable transparent window 18 to prevent well fluid from entering the housing 11. Associated with the camera 8 is a film-advancing mechanism 19, the driving motor 19a of which is electrically connected by conductors 20 (FIG. 2) to a power pack 21. The power pack 21 is connected to a suitable outside source of power and a switch (not shown) at the top of the well by electrical conductors forming part of a fluid-tight cable 22 that extends through a hole 23 in the upper portion 11a of the housing 11. The cable 22 is sealed to the housing 11 by packing 24 and a packing gland 25 threadedly received in the hole 23 to prevent leakage of well fluid into the housing 11.

As fully explained in the above-identified patent, when the said switch at the top of the well is closed, the power pack 21 energizes the motor 19a of the film-advancing mechanism 19 until an unexposed frame of film is disposed at the focal points of the lenses 16. The film then remains motionless until the switch is again closed. The lamp 13 is connected by electrical conductors 13a to the power pack 21, which, when the said switch at the top of the well is opened, energizes the lamp 13 in a manner causing it to be lighted for a brief interval.

The pump 7 may be actuated by a solenoid 26 connected to an outside source of power 27 (FIG. 5) by electrical conductors 28 which are likewise included in the cable 22. The pump is adapted to be independently actuated by closing a pump switch 29 located at the surface of the well. As an alternative arrangement, the pump 7 may be associated with the film advancing mechanism 19 so that the pump is operated either at the time when the film is advanced or a predetermined time interval thereafter. The pump 7 is connected to a dye supply tank 30 which is secured to the bottom of the case 31 (FIG. 2) of the power pack 21.

The pump 7 (FIG. 3) comprises a generally T-shaped housing 32 having an inlet port 33 in communication with the interior of the tank 30, a discharge port 34, and a cylinder 36 in communication with both ports 33 and 34. An intake ball check valve 37 is supported on a relatively light helical compression spring 38 which is, in turn, held in operative position by a snap ring 39. The valve 37 is normally urged by the spring 38 against an annular seat 41 encircling the inlet port 33. A similar ball check valve 42 is disposed in the discharge port 34 and is yieldably held in sealing engagement against an annular seat 43 by a helical compression spring 44 which is held in operative position by a snap ring 46. A piston 47 is slidably received in the cylinder 36 and is rigid with a connecting rod 48 which is connected to the actuating element 49 of the solenoid 26. Brackets 52 to which the solenoid 26 is fastened, and a head plate 53 having an aperture 54 through which the connecting rod 48 is free to reciprocate, are secured to the end of the cylinder 36 by bolts 56. A helical spring 57 encircling the connecting rod 48 is under compression between the head plate 53 and a flange 58 on the rod 48 to normally hold the piston 47 in the retracted position shown in FIG. 3. When the solenoid 26 is energized, the piston 47 moves in the direction of the arrow A (FIG. 3) to expel a charge of dye through the discharge port 34 and through a length of flexible tubing 59 (FIGS. 1, 2 and 3) which communicates at one end with the discharge port 34 while the other end is supported by the bracket 14 at a point between the lamp 13 and the housing 11. The bore of the tubing 59 is open throughout its length so that a quantity of dye is discharged from the tubing 59 each time the pump 7 is actuated.

The camera 8, the pump 7, the film-advancing mechanism 19, and the power pack 21 are carried by brackets 64 (FIGS. 2 and 4), which are slidably received in channels 66 of a base 67 that is secured within the housing 11 by bolts 68. An angle bracket 69 (FIG. 2) welded to the case 31 of the power pack 21 contacts the top of the base 67 to accurately position the internal parts of the apparatus 5 within the housing 11 and bolt 70 releasably secures the angle bracket 69 to the base 67. In order to load the camera 8 with film and fill the supply tank 30 with dye, the upper portion 11a of the housing 11 is unscrewed from the lower portion 11b thereof, and the bolt 70 is removed so that the entire operative structure may be slid out of the housing 11. Both the tubing 59 and the wires 13a extend through the tubular bracket 14 and preferably both the tubing 59 and the wires 13a are flexible and of sufficient length to permit removal of the assembly without disconnecting them.

Although other distinctively colored material may be used, it is preferable to use a colored, liquid dye having a specific gravity substantially the same as that of the fluid within the well being tested but one which will not readily mix with the fluid so that the dye will retain a reasonably well defined form in the fluid for a length of time sufficient to permit two or more pictures to be taken. By using color film in the camera 8 and a dye of different color than the well fluid, a clearer image will be formed on the film.

In describing the operation of the leak locating apparatus 5 of the present invention, it will be assumed that a water well is to be tested. The tank 30 should be filled with dye, and the camera 8 properly loaded with film. Initially the pump 7 may not be primed and the tubing 59 may be empty and must be filled with dye before operation of the dye discharging apparatus can be depended upon. Therefore, the pump switch should be opened and closed several times to prime the pump 7 and fill the tubing 59 with dye before a series of tests is begun. The apparatus is then ready to be lowered into the water in the well by means of the cable 12.

After having been submerged, the apparatus is either lowered measured distances from the top or raised measured distances from the bottom of the well. This permits one or more exposures to be taken at each of a plurality of elevations. A record should be kept of the elapsed time between exposures. In making each exposure the operator first closes the camera switch (not shown) at the surface of the well, thus causing the film advancing mechanism 19 to advance an unexposed strip or frame of film to the focal points of the lenses 16 of the camera 8. The pump switch 29 at the surface of the well is then closed, thus energizing the solenoid 26 of the pump 7 to move the piston 47 in the direction of the arrow A (FIG. 3).

On each rearward stroke of the piston 47, i.e., in the direction opposite that of the arrow A (FIG. 3), suction created in the cylinder 36 causes the inlet valve 37 to compress the spring 38 and recede from the seat 41 to permit a charge of dye to enter the cylinder 36. On each stroke of the piston 47 in the direction of the arrow A (FIG. 3), dye is forced from the cylinder 36 and against the ball 42, displacing the ball 42 from the seat 43, and positively forcing dye into and through the tube 59. In this manner, after the pump is primed and after the tube is filled with dye, a puff or cloud of dye is introduced into the water of the well with each forward stroke of the piston 47.

A brief interval of time after the pump switch 29 has been closed, the operator opens the camera switch. This activates the power pack 21 to cause the lamp 13 to light, as fully explained in the above-identified patent, thereby exposing a frame of the film, and creating thereon an image showing the form and position of the puff of dye. An unexposed frame of the film is then advanced into the focal points of the camera lenses 16 (FIG. 2) by closing the camera switch. This places the camera 8 in condition for taking another picture.

Several photographs may be taken in this way while the apparatus remains at the same elevation within the well; and preferably the several exposures at a single elevation are made at predetermined, uniform time intervals. After a series of such exposures are made at one elevation the apparatus is lowered or raised a predetermined distance and the above-described procedure is repeated.

In this way, a permanent photographic record of the well casing and fluid therein can be made, from which the direction of flow of fluid in the well may be determined by study of the shape and position of the puff or puffs of dye shown in each of the photographs and by comparison thereof with the shape and position of the same puff or puffs of dye shown in other photographs of the same series. Since the photographs are stereoscopic, the cloud-like puff or puffs of dye will be shown in three dimensions, thus revealing the direction of movement of the dye toward or away from the camera 8 as well as toward or away from the well casing. Therefore, if the elevations at which the tests are made are spaced apart sufficiently small distances, the direction of movement of a puff or dye can be ascertained with sufficient accuracy to reveal the precise location of a casing leak responsible for a pressure differential in the well fluid causing movement of the dye with respect to the well casing. Furthermore, the three dimensional character of the stereoscopic photographs makes it possible to estimate with reasonable accuracy the distance that a puff of dye moves during the time interval between successive exposures; and since the time duration of the interval is known, the photographs can be interpreted to yield an indication of the rate of flow of the well fluid at the elevation where a series of photographs has been made.

In the event of a casing leak of considerable magnitude, therefore, by comparison of the flow rates estimated from photographs taken above and below a leak, the rate of leakage can be estimated with reasonable accuracy.

Although a solenoid operated pump 7 has been shown and described as the means for introducing a dye into the fluid of the well being tested, it is to be understood that any suitable dye ejecting means, such as a pressure tank and a solenoid-operated discharge valve, may be used in place of the pump 7.

While a particular apparatus has been shown and described, it will be understood that various changes and modifications may be made therein without departing from the spirit of the invention or scope of the appended claims.

The present invention and the manner in which the same is to be used having been thus shown and described, what is claimed as new and for which protection by Letters Patent is desired, is:

1. An apparatus for detecting and recording the direction of flow of liquid in a well comprising a stereoscopic camera having a film therein, means for mounting said camera within the well, said mounting means being adapted to successively dispose the camera at different positions in the liquid in the well, means for advancing the film within the camera, means carried by the camera mounting means and spaced a predetermined distance from the lens of said camera for introducing a dye into the liquid in the well at a point within the field of the camera, said dye having a specific gravity substantially equal to the specific gravity of the liquid in the well, lighting means mounted adjacent said dye introducing means and operable in timed relation therewith to create on the film an image of the dye and the adjacent region of the well.

2. An apparatus for detecting and recording the direction of liquid flow in a well comprising a stereoscopic camera having film therein, means for mounting said camera within the well, said mounting means being adapted to successively dispose the camera at different positions in the liquid in the well, means for intermittently advancing the film within the camera, means carried by the camera mounting means and spaced a predetermined distance from the lens of said camera for introducing a quantity of dye into the liquid in the well, lighting means carried by the camera mounting means adjacent said dye introducing means and connected with said film advancing means for operation in timed relation therewith for creating on the film an image showing the shape and position of the dye and the condition of the region of the well within the field of said camera.

3. An apparatus for detecting and recording the direction of flow of liquid in a well, comprising a stereoscopic camera having color sensitive film therein, means for mounting said camera within the well, said mounting means being adapted to successively dispose the camera at different positions in the liquid in the well, means for advancing the film within the camera, means carried by the camera mounting means and spaced a predetermined distance from the lens of said camera for introducing into the liquid within the field of the camera a dye of different color than the liquid, lighting means mounted on the camera mounting means adjacent said dye introducing means for exposing said film, control means positioned at a remote location for actuating said dye introducing means, and second control means positioned at a remote location for actuating said lighting means and said film advancing means while said colored dye is within the field of the stereoscopic camera to create on the film a three dimensional colored image of the colored dye and the well surfaces within the field of the camera.

References Cited in the file of this patent

UNITED STATES PATENTS

| | | |
|---|---|---|
| Re. 24,076 | Laval | Oct. 18, 1955 |
| 1,658,537 | Reinhold | Feb. 7, 1928 |
| 2,677,996 | Laval | May 11, 1954 |
| 2,724,267 | Bond et al. | Nov. 22, 1955 |
| 2,829,518 | Rumble et al. | Apr. 8, 1958 |

OTHER REFERENCES

Ewing et al.: "Photography of the Ocean Bottom" in J.O.S.A., volume 36, June 1946, pages 307–321 in article but only page 319 relied upon. Copy in Div. 7.